(12) United States Patent
Kudoh

(10) Patent No.: US 8,508,857 B2
(45) Date of Patent: Aug. 13, 2013

(54) LENS BARREL AND IMAGE PICKUP APPARATUS THAT REALIZE INCREASED SHOOTING MAGNIFICATION AND SLIMMING DOWN

(75) Inventor: Tomoyuki Kudoh, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 295 days.

(21) Appl. No.: 12/909,392

(22) Filed: Oct. 21, 2010

(65) Prior Publication Data

US 2011/0096203 A1 Apr. 28, 2011

(30) Foreign Application Priority Data

Oct. 26, 2009 (JP) .................................. 2009-245534

(51) Int. Cl.
*G02B 15/14* (2006.01)
*G02B 7/02* (2006.01)
*G03B 3/00* (2006.01)
*G03B 21/14* (2006.01)

(52) U.S. Cl.
USPC .............. 359/699; 359/822; 396/79; 353/101

(58) Field of Classification Search
USPC ................. 359/694, 696, 699–701, 703–704, 359/811, 813, 815, 819, 822–823, 826–827, 359/829–830; 396/79, 83; 353/101; 350/429, 350/521, 522, 530, 556; 348/345, 373–376
See application file for complete search history.

(56) References Cited

U.S. PATENT DOCUMENTS

| 6,049,432 A * | 4/2000 | Machida et al. ............... 359/700 |
| 7,595,937 B2 | 9/2009 | Yasuda |
| 2004/0130803 A1* | 7/2004 | Iwasaki ......................... 359/700 |
| 2007/0195437 A1 | 8/2007 | Yasuda |
| 2010/0067122 A1 | 3/2010 | Yasuda |

FOREIGN PATENT DOCUMENTS

JP 2007-219345 8/2007

* cited by examiner

*Primary Examiner* — Dawayne A Pinkney
(74) *Attorney, Agent, or Firm* — Cowan, Liebowitz & Latman, P.C.

(57) ABSTRACT

A lens barrel that can realize increased shooting magnification and slimming down of an image pickup apparatus without increasing drive load and optical accuracy error in driving the lens barrel along an optical axis. A cam follower follows cam grooves in a cam cylinder to move along the optical axis, and engages with a lens holding frame to move the same from a retracted state to a shooting state. A compression coil spring urges the cam follower and the lens holding frame in such a direction as to draw them away from each other, and when the cam follower moves from the shooting state to the retracted state, engages with the lens holding frame to move the same toward an image plane. A fixed portion coming into abutment with the lens holding frame restricts movement of the lens holding frame toward the image plane.

5 Claims, 11 Drawing Sheets

LENS BARREL AND IMAGE PICKUP APPARATUS THAT REALIZE INCREASED SHOOTING MAGNIFICATION AND SLIMMING DOWN

BACKGROUND OF THE INVENTION

1. Field of the Invention

The present invention relates to a lens barrel provided in an image pickup apparatus such as a film camera or a digital camera, and an image pickup apparatus having the lens barrel.

2. Description of the Related Art

Some of this type of conventional lens barrels have a zoom mechanism that causes a cam cylinder to move a plurality of lens holding frames holding a plurality of lenses along an optical axis while causing a rotation restriction cylinder to restrict movement of the lens holding frames in a rotational direction so as to move the lenses to predetermined positions.

Incidentally, with recent demand for higher shooting magnification, a lens barrel tends to be large due to an increase in the number of lens groups and an increase in the length of the lens barrel in its fully extended state. On the other hand, there has also been demand for slimming down of a camera, and the thickness of a camera with a lens barrel retracted therein has been required to be reduced to a minimum.

For slimming down of a camera, it can be envisaged to reduce the size of barrel members in the direction of the optical axis and connect the lens barrels together in a multi-stage configuration, but arranging a plurality of cams without crossing them is difficult due to many restrictions.

Moreover, the distance traveled by inner lens groups in the lens barrel along the optical axis tends to increase depending on a design of a lens optical system, and it is becoming very difficult for the cam cylinder to cover strokes of the inner lens groups.

Accordingly, there has been proposed the technique that, to ensure movement of inner lens groups in a lens barrel on the optical axis, a lens barrel train extending toward an image plane is additionally provided inside a typical cam cylinder so as to extend strokes of the inner lens groups toward the image plane (Japanese Laid-Open Patent Publication (Kokai) No. 2007-219435).

According to the technique disclosed in Japanese Laid-Open Patent Publication (Kokai) No. 2007-219435, increased shooting magnification and slimming down of an image pickup apparatus can be realized, but because a plurality of barrel members are required to be provided inside the lens barrel, and hence the diameter of the lens barrel, and drive load and optical accuracy error in moving the lens barrel along the optical axis are increased.

SUMMARY OF THE INVENTION

The present invention provides a lens barrel and an image pickup apparatus that can realize increased shooting magnification and slimming down of the image pickup apparatus without increasing drive load and optical accuracy error in driving the lens barrel along an optical axis.

Accordingly, a first aspect of the present invention provides a lens barrel including a zoom mechanism that moves along an optical axis between a shooting state and a retracted state to change shooting magnifications, comprising a lens holding unit configured to hold a lens and be movable along the optical axis, a cam follower disposed on an outer peripheral side of the lens holding unit, and configured to follow cam grooves formed in a cam cylinder to move along the optical axis, and when moving from the retracted state to the shooting state, engage with the lens holding unit to move the lens holding unit from the retracted state to the shooting state, an urging unit interposed between the cam follower and the lens holding unit, and configured to urge the cam follower and the lens holding unit in such a direction as to draw the cam follower and lens holding unit away from each other, and when the cam follower moves from the shooting state to the retracted state, engage with the lens holding unit to move the lens holding unit toward an image plane, and a restriction unit configured to, when the lens holding unit moves toward the image plane, come into abutment with the lens holding unit in the retracted state of the lens holding unit, and restrict movement of the lens holding unit toward the image plane.

Accordingly, a second aspect of the present invention provides an image pickup apparatus comprising the above lens barrel, wherein the lens barrel includes a zoom mechanism that moves along in a direction of optical axis between a shooting state and a retracted state to change shooting magnifications.

According to the present invention, because the interval between the cam follower and the lens holding unit in the direction of the optical axis can be changed when the lens barrel is in the retracted state position and the shooting state, relative strokes of the lens groups inside the lens barrel can be increased.

As a result, increase in shooting magnification and slimming down of the image pickup apparatus can be realized without increasing drive load and optical accuracy error in driving the lens barrel along the optical axis.

Further features of the present invention will become apparent from the following description of exemplary embodiments (with reference to the attached drawings).

BRIEF DESCRIPTION OF THE DRAWINGS

FIG. 2 is an external perspective view of the digital camera in FIG. 1 with its power ON.

DESCRIPTION OF THE EMBODIMENTS

The present invention will now be described in detail with reference to the drawings showing embodiments thereof.

Figure 1:
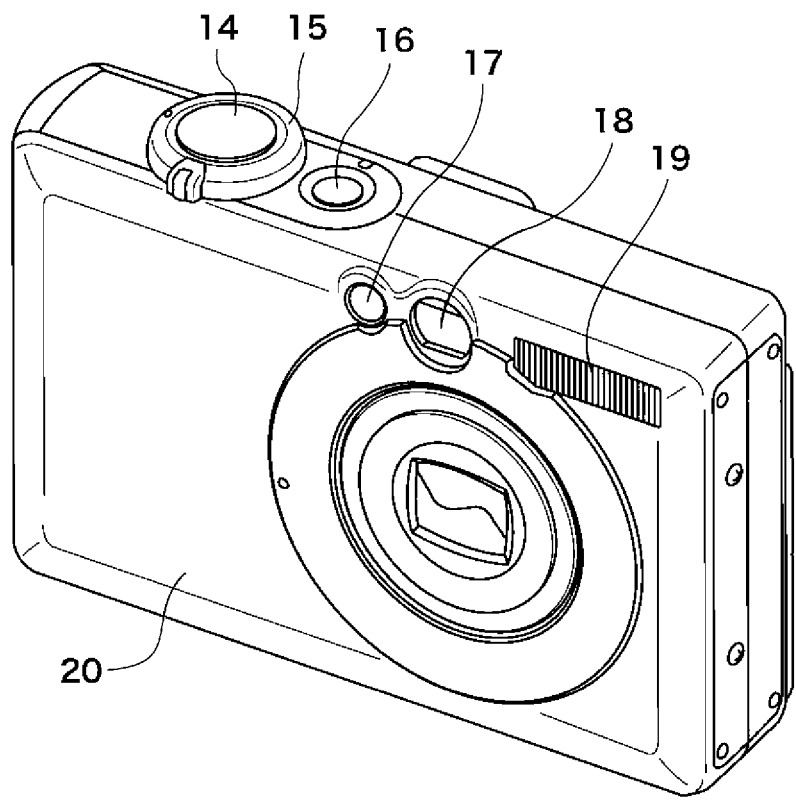
FIG. 1 is an external perspective view of a digital camera, which is a first embodiment of an image pickup apparatus having a lens barrel according to the present invention, from an anterior view.
Figure 2:
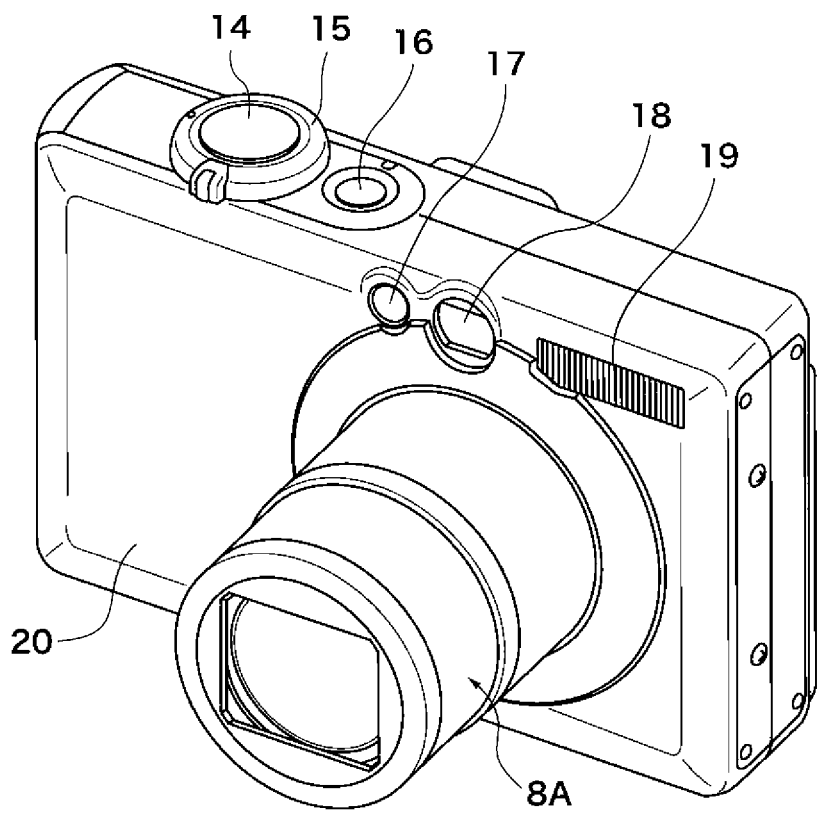
Figure 3:
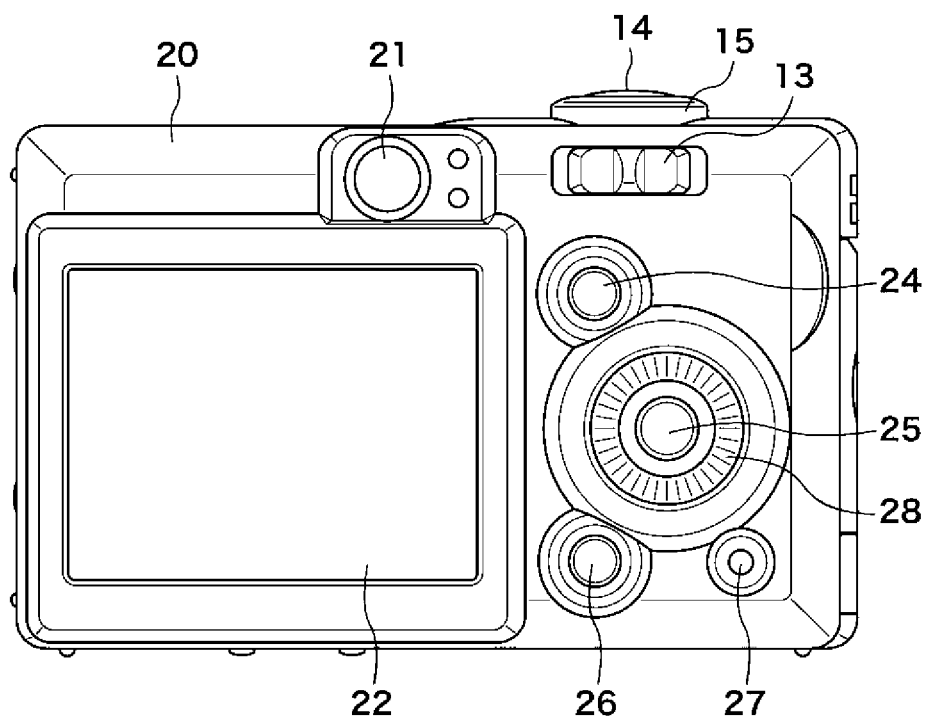
FIG. 3 is a rear view of FIG. 1.
Figure 4:
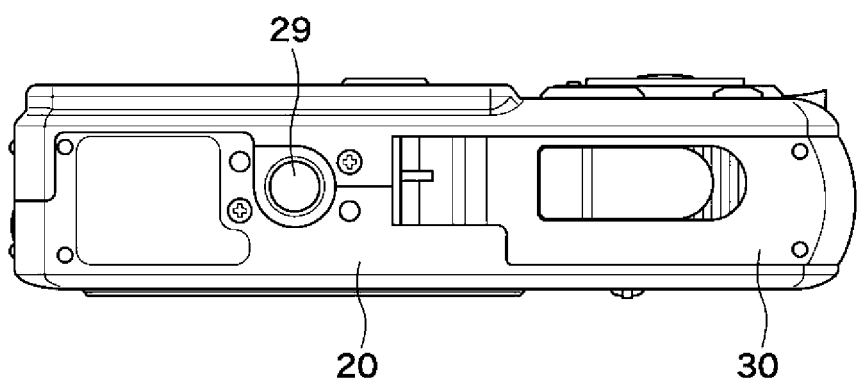
FIG. 4 is a bottom view of FIG. 1.

FIG. 1 is an external perspective view of a digital camera, which is a first embodiment of an image pickup apparatus having a lens barrel according to the present invention, from an anterior view, FIG. 2 is an external perspective view of the digital camera in FIG. 1 with its power ON, FIG. 3 is a rear view of FIG. 1, and FIG. 4 is a bottom view of FIG. 1.

Referring to FIGS. 1 and 2, the digital camera 20 according to the present embodiment has a zoom mechanism that moves along an optical axis between a shooting state and a retracted state to change shooting magnifications. In a front face of the digital camera 20, there are disposed a finder 18 that determines a composition of a subject, an auxiliary light source 17 for use in performing photometry and ranging, a strobe 19, and a lens barrel 8A. In an upper face of the digital camera 20, there are disposed a release button 14, a power switching button 16, and a zoom switch 15.

Also, as shown in FIG. 3, in a rear face of the digital camera 20, there are disposed operation buttons 24 to 28, a display 22 such as an LCD, and a finder eyepiece 21. Further, as shown in FIG. 4, in a bottom face of the digital camera 20, there are disposed a tripod mounting portion 29, and a cover 30 for a memory card drive 42 and a battery insertion part (not shown).

Figure 5:
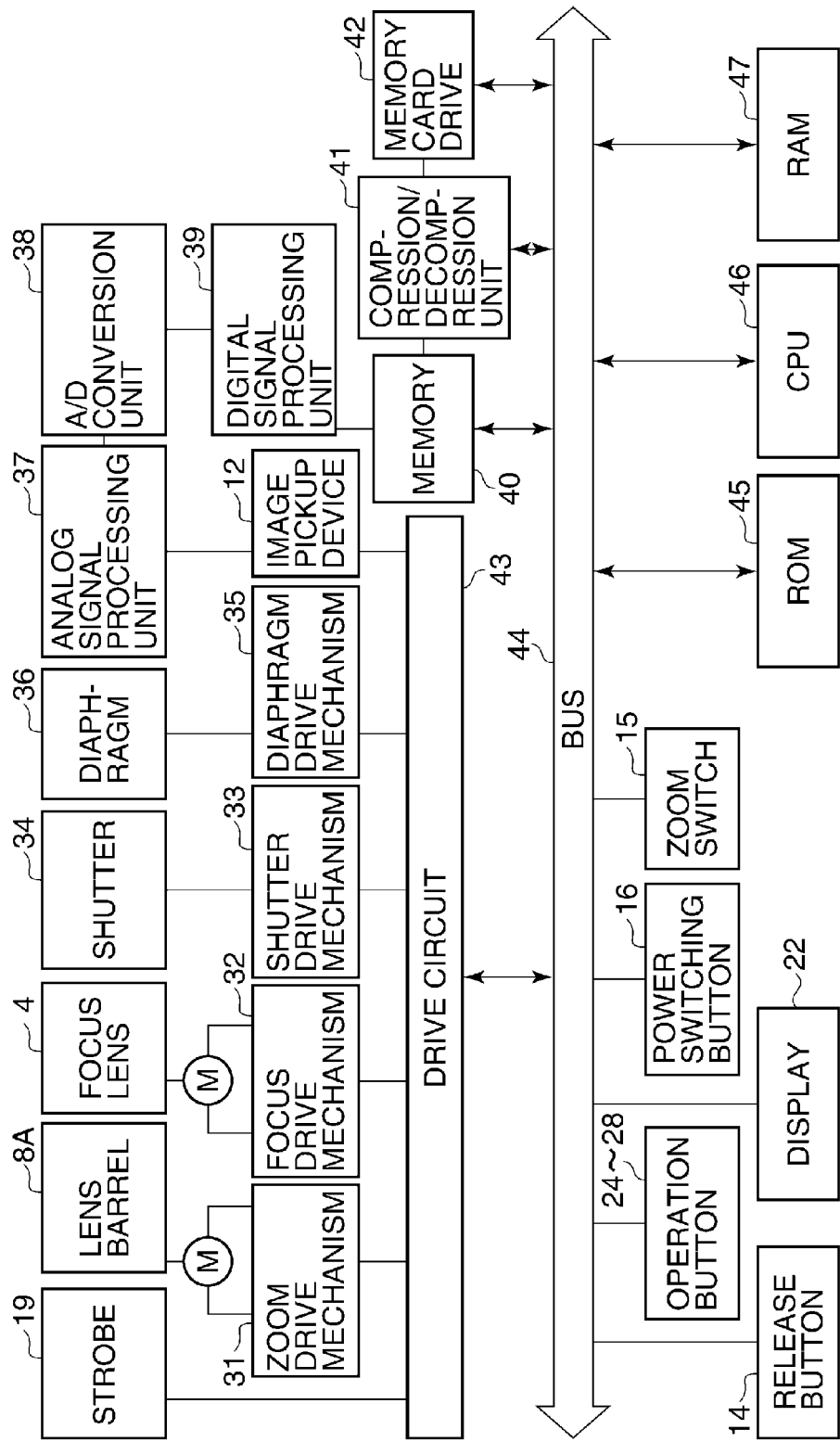
FIG. 5 is a control block diagram of the digital camera.

FIG. 5 is a control block diagram of the digital camera 20 according to the present embodiment.

To a bus 44 are connected a CPU 46, a ROM 45, a RAM 47, the release button 14, the operation buttons 24 to 28, the display 22, the power switching button 16, the zoom switch 15, a memory 40, a compression/decompression unit 41, the memory card drive 42, and a drive circuit 43.

To the drive circuit 43 are connected a zoom drive circuit 31 that zoom-drives the lens barrel 8A, a focus drive mechanism 32 that drives a focus lens 4, a shutter drive mechanism 33 that drives a shutter 34, and a diaphragm drive mechanism 35 that drives a diaphragm 36.

To the drive circuit 43 are also connected an image pickup device 12, such as a CCD sensor or a CMOS sensor, and the strobe 19. These units connected to the drive circuit 43 are drivingly controlled via the drive circuit 43 in accordance with signals from the CPU 46.

The ROM 45 stores various control programs and others, and the RAM 47 stores data required for the control programs. An analog signal processing unit 37 carries out an analog process on image data output from the image pickup device 12, and outputs the resulting analog data to an A/D conversion unit 38.

The A/D conversion unit 38 converts the analog data captured from the image pickup device 12 to digital data, and outputs the digital data to a digital signal processing unit 39. The digital signal processing unit 39 carries out a predetermined process on the digital data obtained as a result of the conversion by the A/D conversion unit 38, and outputs the resulting data as image data to the memory 40.

The image data stored in the memory 40 is subjected to a compression process and the like such as JPEG compression or TIFF compression by the compression/decompression unit 41 in accordance with operation of the operation button 24, and then output to and stored in a memory card inserted in the memory card drive 42.

Moreover, the image data stored in the memory 40 or the image data stored in the memory card drive 42 may be decompressed by the compression/decompression unit 41, and then displayed on the display 22 via the bus 44. When a user looks at the image displayed on the display 22 and determines that it is unnecessary, it may be deleted through operation of the operation button 26.

Figure 6:
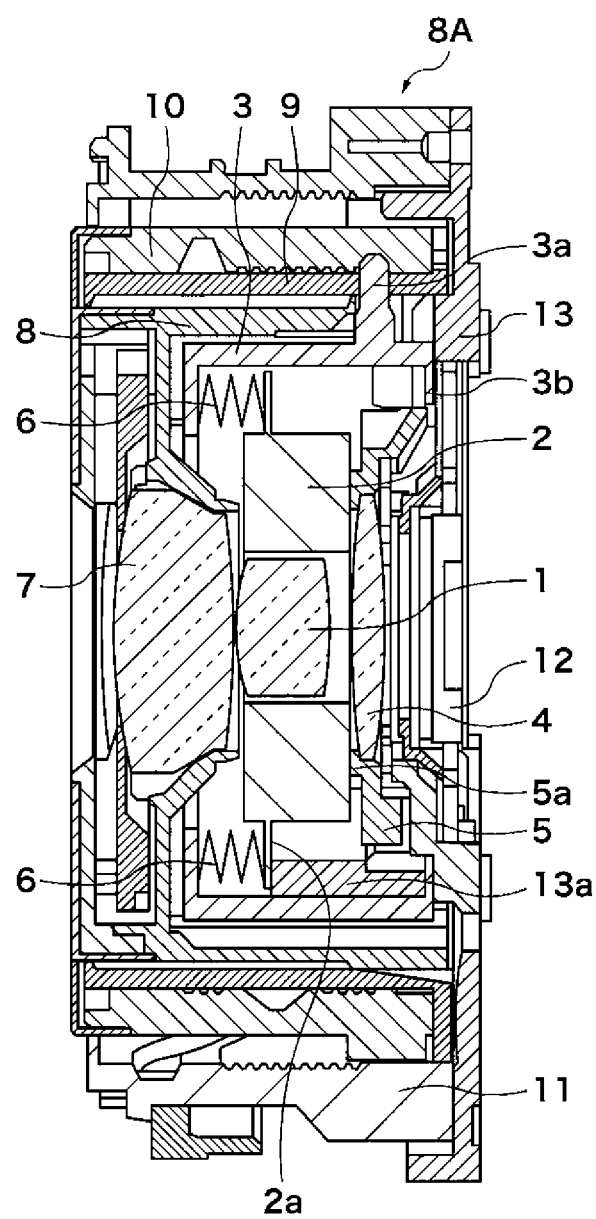
FIG. 6 is a cross-sectional view of the lens barrel in a retracted state.
Figure 7:
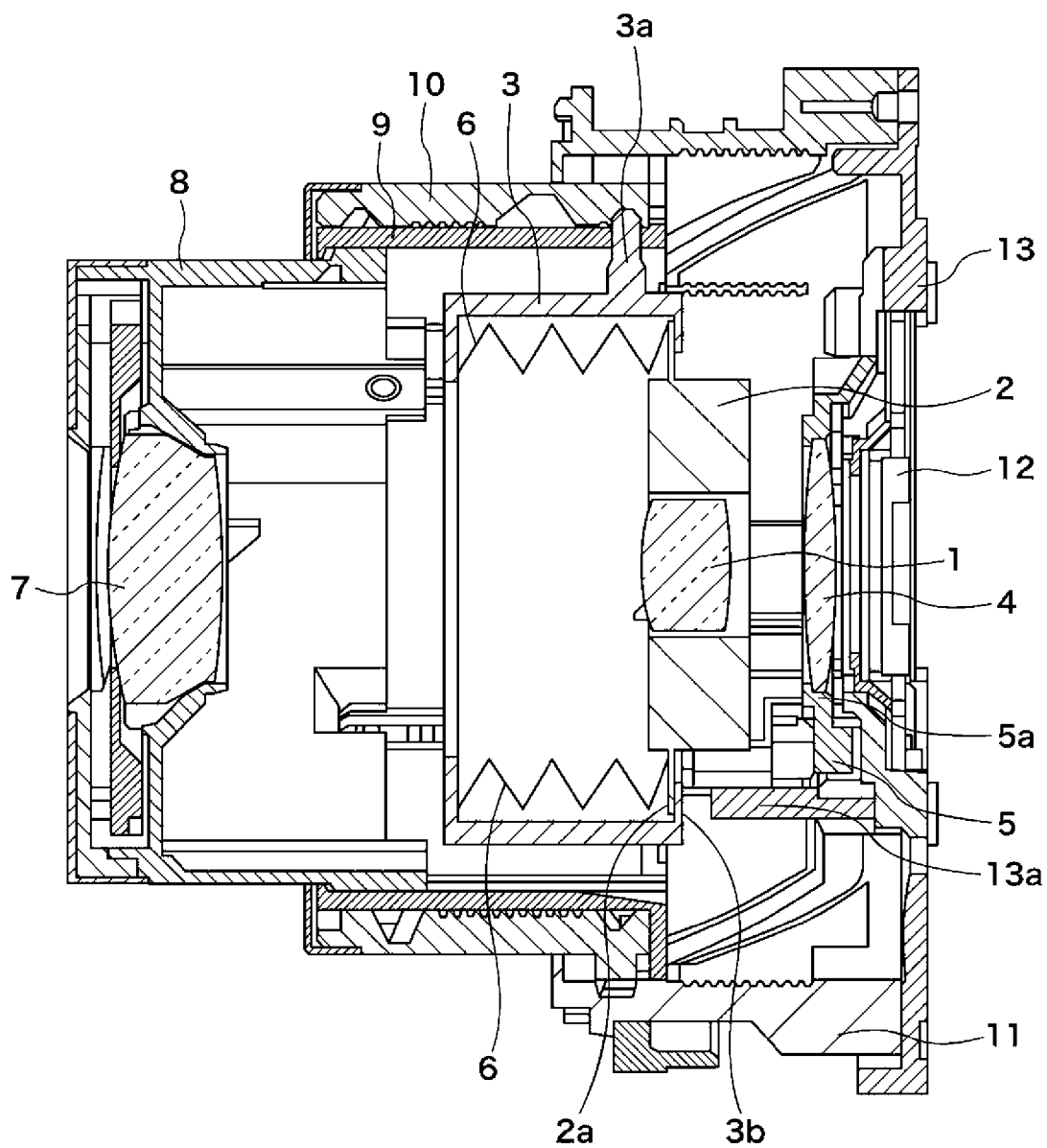
FIG. 7 is a cross-sectional view of the lens barrel in a shooting state.
Figure 8:
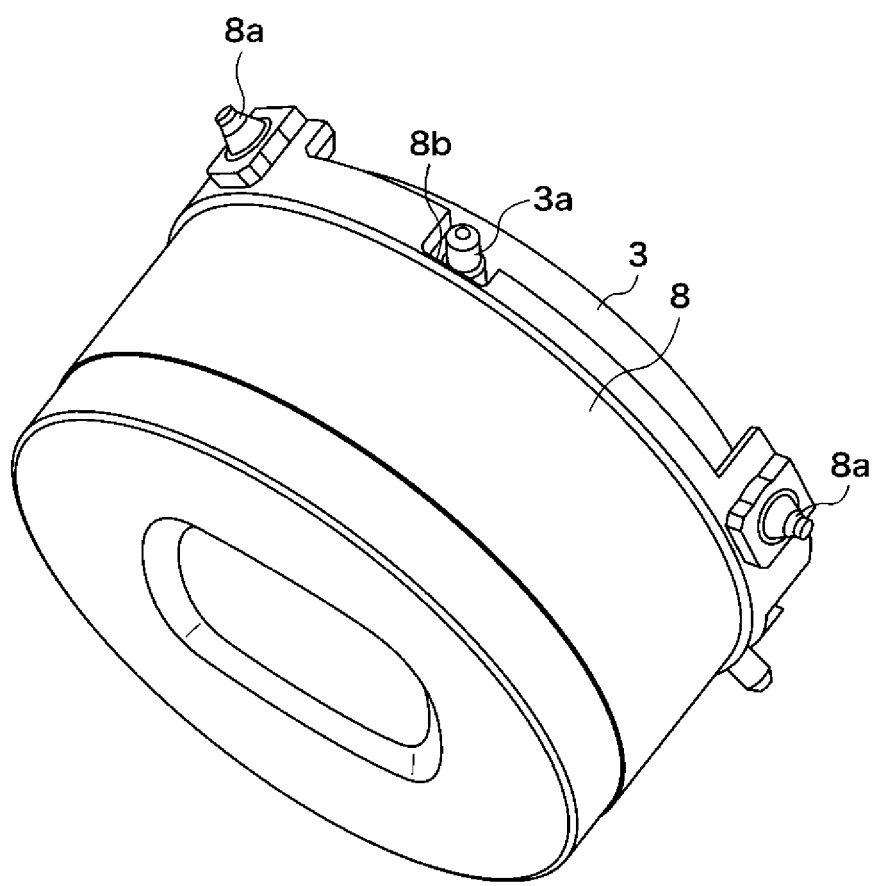
FIG. 8 is an external perspective view of a third lens holding frame with a cam follower housed therein.

Referring next to FIGS. 6 to 8, a description will be given of the lens barrel 8A.

FIG. 6 is a cross-sectional view of the lens barrel 8A in the retracted state, FIG. 7 is a cross-sectional view of the lens barrel 8A in the shooting state, and FIG. 8 is an external perspective view of a third lens holding frame 8 with a cam follower 3 housed therein.

Referring to FIGS. 6 and 7, the lens barrel 8A is constructed such that a lens 1 is held on a lens holding frame 2, and a third lens 7 disposed on a subject side of the lens 1 is held on the third lens holding frame 8 located on an outer peripheral side of the lens holding frame 2. In the present embodiment, the lens 1 and the third lens 7 constitute a lens group that determines a zoom range.

Also, a second lens holding frame 5 that holds a second lens 4 is disposed on an image plane side (the image pickup device 12 side) of the lens holding frame 2. In the present embodiment, it is assumed that the second lens 4 is a focus lens. Here, the lens holding frame 2, the second lens holding frame 5, and the third lens holding frame 8 correspond to respective examples of a lens holding unit, a second lens holding unit, and a third lens holding unit of the present invention.

A straight-ahead movement restriction cylinder 9 is disposed on an outer peripheral side of the third lens holding frame 8, a cam cylinder 10 is disposed on an outer peripheral side of the straight-ahead movement restriction cylinder 9, and a fixed cylinder 11 is disposed on an outer periphery of the cam cylinder 10. The cam follower 3 is disposed between the lens holding frame 2 and the third lens holding frame 8. Follower pins 3a and follower pins 8a (see FIG. 8) are disposed on respective outer peripheral surfaces of end portions of the cam follower 3 and the third lens holding frame 8 on the image plane side.

The lens holding frame 2 and the third lens holding frame 8 are held by the straight-ahead movement restriction cylinder 9 such as to be able to move straight ahead along the optical axis. Rotation of the cam cylinder 10 causes the follower pins 3a of the cam follower 3 and the follower pins 8a of the third lens holding frame 8 to follow cam grooves (not shown) formed in an inner peripheral surface of the cam cylinder 10, so that the lens holding frame 2 and the third lens holding frame 8 move straight ahead along the optical axis.

Also, the cam cylinder 10 follows cam grooves (not shown) formed in an inner peripheral surface of a fixed cylinder 11 to move along the optical axis while rotating. As a result, the lens groups in the lens barrel 8A move from the state shown in FIG. 6 to the state shown in FIG. 7, so that the lens barrel 8A enters a state of readiness for shooting.

Projection piece 2a, which radially projects outward, is provided in an outer peripheral portion of the lens holding frame 2, and a compression coil spring 6 is interposed between the projection piece 2a and an end wall of the cam follower 3 on the subject side.

The compression coil spring 6 urges the lens holding frame 2 and the cam follower 3 in such a direction as to draw the lens holding frame 2 and the cam follower 3 away from each other along the optical axis, and becomes stretched when the lens barrel 8A is in a shooting state (extended state).

When the cam follower 3 moves toward a subject, an end wall 3b of the cam follower 3 on the image plane side engages with the projection piece 2a of the lens holding frame 2 to push the lens holding frame 2 toward the subject, and this causes the lens holding frame 2 to move a predetermined amount from the state in FIG. 6 toward the subject along the optical axis.

At this time, the lens holding frame 2 is positioned on the image plane side relative to the follower pins 3a of the cam follower 3 (see FIG. 7).

On the other hand, when the lens barrel 8A is in the retracted state (collapsed state), movement of the cam follower 3 toward the image plane causes the compression coil spring 6 to become compressed and engage with the projection piece 2a of the lens holding frame 2 to push the lens holding frame 2 toward the image plane, causing the lens holding frame 2 to move toward the image plane.

Then, when the lens holding frame 2 comes into the retracted state, the projection piece 2a of the lens holding frame 2 comes into abutment with a fixed portion 13a provided in a holding frame 13 for the image pickup device 12. It should be noted that in this case, a rear surface of the lens holding frame 2 may be brought into abutment with a fixed portion 5a provided in the second lens holding frame 5. As a result, movement of the lens holding frame 2 toward the image plane from the retracted state is restricted, and the lens holding frame 2 is positioned along the optical axis in the retracted state.

At this time, the lens holding frame 2 is positioned on the subject side relative to the follower pins 3a of the cam follower 3 (see FIG. 6).

As described above, in the present embodiment, the interval between the cam follower 3 and the lens holding frame 2 can be changed when the lens barrel 8A is in the retracted state and the shooting state.

Figure 9:
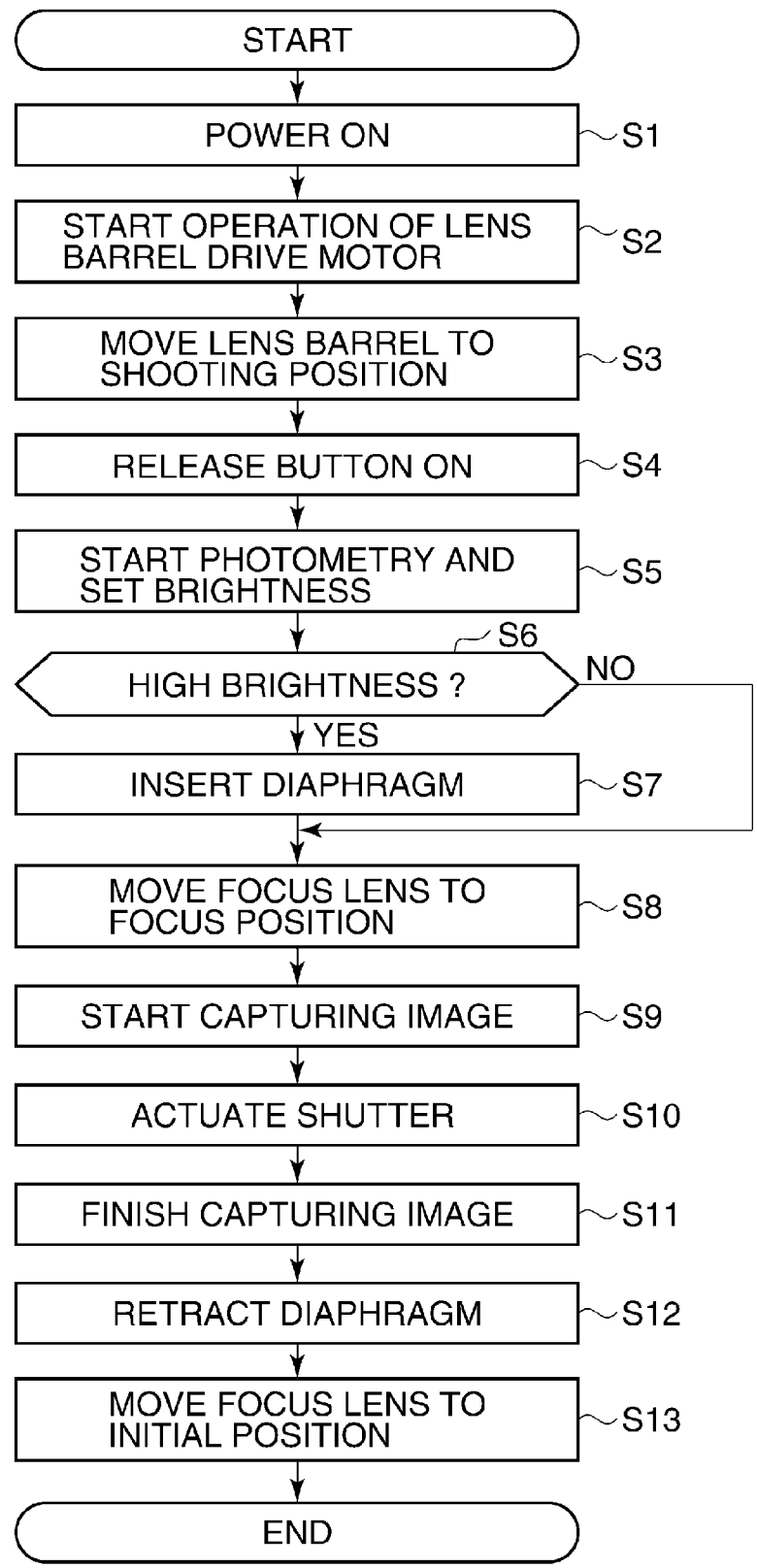
FIG. 9 is a flowchart useful in outlining a shooting operation of the digital camera.

Referring next to FIG. 9, a brief description will be given of a shooting operation of the digital camera 20 according to the present embodiment. Processes in FIG. 9 are carried out by the CPU 46 in accordance with programs stored in a ROM or the like and loaded into the RAM 47.

In step S1, when power is turned on, the CPU 46 proceeds to step S2, in which the CPU 46 controls the zoom drive mechanism 31 via the drive circuit 43, thus extending the lens barrel 8A into the shooting state.

In the step S3, the CPU 46 ascertains that the lens barrel 8A has moved into the shooting state, and then proceeds to step S4.

In the step S4, when the release button 14 is turned on, the CPU 46 proceeds to step S5, in which the CPU 46 carries out photometry using the auxiliary light source 17 to obtain brightness information on the subject, and proceeds to step S6.

In the step S6, the CPU 46 determines whether or not the brightness information obtained in the step S5 is indicative of a higher brightness than a predetermined brightness.

Then, when the brightness information obtained in the step S5 is indicative of a higher brightness than the predetermined brightness, the CPU 46 proceeds to step S7, in which the CPU 46 controls the diaphragm drive mechanism 35 via the drive circuit 43, thus inserting the diaphragm 36 into the optical axis to change the amount of incident light. Then, the CPU 46 proceeds to step S8.

On the other hand, when the brightness information obtained in the step S5 is indicative of a lower brightness than the predetermined brightness, the CPU 46 proceeds to step S8 with the diaphragm 36 receding from the optical axis without causing the diaphragm 36 to operate.

In the step S8, the CPU 46 controls the focus drive mechanism 32 via the drive circuit 43, thus causing the focus lens 4 to move to such a position at which the subject is in focus. Then, in step S9, the CPU 46 starts capturing image data form the image pickup device 12, and proceeds to step S10.

In the step S10, the CPU 46 controls the shutter drive mechanism 33 via the drive circuit 43, thus causing the shutter 34 to move from its opened state to its closed state so as to block incident light, and then proceeds to step S11.

In the step S11, the CPU 46 finishes capturing the image data from the image pickup device 12, and then proceeds to step S12.

In the step S12, in a case where the diaphragm 36 has been inserted into the optical axis, the CPU 46 controls the diaphragm drive mechanism 35 via the drive circuit 43, thus causing the diaphragm 36 to retract from the optical axis, and then proceeds to step S13.

In the step S13, the CPU 46 controls the focus drive mechanism 32 via the drive circuit 43, thus causing the focus lens 4 to move to an initial position, and then terminates the process.

As described above, because the interval between the cam follower 3 and the lens holding frame 2 along the optical axis can be changed when the lens barrel 8A is in the retracted state and the shooting state, relative strokes of the lens groups inside the lens barrel 8A can be increased.

As a result, increased shooting magnification and slimming down of the digital camera 20 can be realized without increasing in the diameter of the lens barrel 8A and drive load and optical accuracy error in driving the lens barrel 8A along the optical axis.

Figure 10:
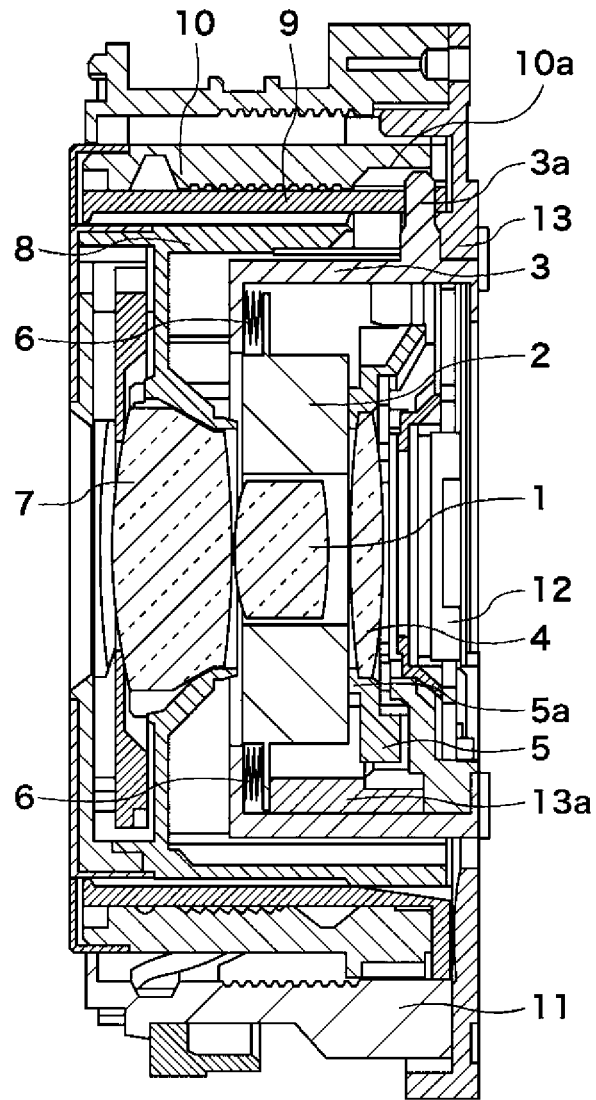
FIG. 10 is a cross-sectional view of a lens barrel in a retracted state in a digital camera which is a second embodiment of an image pickup apparatus having a lens barrel according to the present invention.
Figure 11:
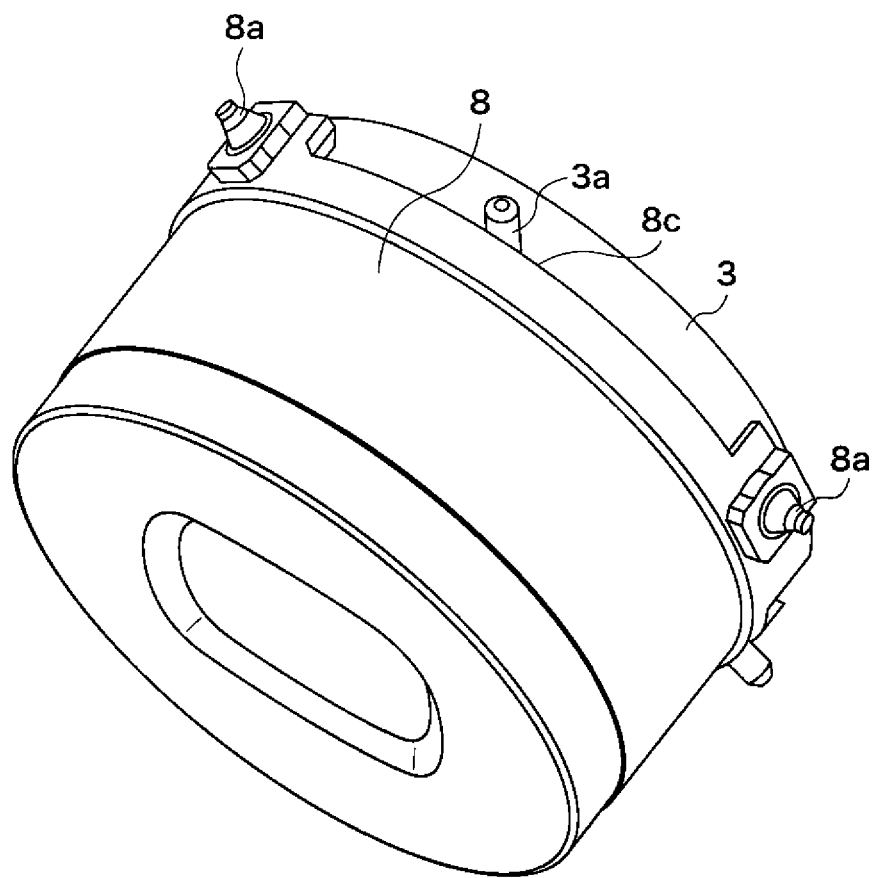
FIG. 11 is an external perspective view of a third lens holding frame with a cam follower housed therein.

Referring next to FIGS. 10 and 11, a description will be given of a digital camera which is a second embodiment of an image pickup apparatus having a lens barrel according to the present invention.

FIG. 10 is a cross-sectional view of the lens barrel 8A in a retracted state, and FIG. 11 is an external perspective view of the third lens holding frame 8 with the cam follower 3 housed therein. It should be noted that portions overlapping or equivalent to those in the above described first embodiment will be described using the same reference numerals.

In the present embodiment, when the lens barrel 8A is to be moved to the retracted state, the projection piece 2a of the lens holding frame 2 is brought into abutment with and held on the fixed portion 13a of the holding frame 13, or the rear surface of the lens holding frame 2 is brought into abutment with and held on the fixed portion 5a of the second lens holding frame 5 as is the case with the above described first embodiment.

After that, as shown in FIG. 10, the follower pins 3a of the cam follower 3 move toward the image plane along retracting grooves 10a provided along the optical axis in the inner peripheral surface of the cam cylinder 10.

Specifically, as shown in FIG. 11, when the third lens holding frame 8 moves from the subject side toward the image plane, the follower pins 3a are pushed toward the image plane by an end portion 8c of the third lens holding frame 8 on the image plane side, so that the follower pins 3a move along the retracting grooves 10a toward the image plane.

In above described first embodiment, as shown in FIG. 8, retracting grooves 8b for the follower pins 3a are provided in an end portion of the third lens holding frame 8 on the image plane side. The retracting grooves 8b may cause degradation in the strength of the third lens holding frame 8, entry of harmful rays into the third lens holding frame 8, and so on.

In the present embodiment, because the retracting grooves 8b of the third lens holding frame 8 can be dispensed with, the strength of the third lens holding frame 8 can be improved, and entry of harmful rays into the third lens holding frame 8 can be prevented. Other arrangements and effects are the same as those in the above described first embodiment.

It should be understood that the present invention is not limited to the illustrative embodiments described above, but materials, shapes, dimensions, forms, numbers, installation location, and so on may be arbitrarily changed without departing from the spirits of the present invention.

For example, although in the above described embodiments, the compression coil spring 6 is used as an illustrative urging unit interposed between the lens holding frame 2 and the cam follower 3, the present invention is not limited to this.

For example, an urging unit such as an elastic member other than a spring, or a cylinder that elastically extends and contracts may be interposed between the lens holding frame 2 and the cam follower 3.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-245534 filed Oct. 26, 2009, which is hereby incorporated by reference herein in its entirety.

What is claimed is:

1. A lens barrel including a zoom mechanism that moves along an optical axis between a shooting state and a retracted state to change shooting magnifications, comprising:
   a first lens holding unit configured to hold a first lens and be movable along the optical axis;
   a cam follower disposed on an outer peripheral side of said first lens holding unit, and configured to follow cam grooves formed in a cam cylinder to move along the optical axis, and when moving from the retracted state to the shooting state, engage with said first lens holding unit to move said first lens holding unit from the retracted state to the shooting state;
   an urging unit interposed between said cam follower and said first lens holding unit, and configured to urge said cam follower and said first lens holding unit in such a direction as to draw said cam follower and first lens holding unit away from each other, and when said cam follower moves from the shooting state to the retracted state, engage with said first lens holding unit to move said first lens holding unit toward an image plane; and
   a restriction unit configured to, when said first lens holding unit moves toward the image plane, come into abutment with said first lens holding unit in the retracted state of said first lens holding unit, and restrict movement of said first lens holding unit toward the image plane,
   wherein when said first lens holding unit comes into abutment with said restriction unit with the movement of said first lens holding unit toward the image plane, and said first lens holding unit does not move toward the image plane, said urging unit is compressed to cause said cam follower to be moved toward the image plane.

2. A lens barrel according to claim 1, further comprising a second lens holding unit configured to hold a second lens and disposed on the image plane side of said first lens holding unit, and said restriction unit is provided in the second lens holding unit.

3. A lens barrel according to claim 1, further comprising a third lens holding unit configured to hold a third lens on a subject side of said first lens holding unit, and when moving toward the image plane, said third lens holding unit engages with follower pins of said cam follower following the cam grooves of the cam cylinder and pushes the follower pins toward the image plane, and retracting grooves that retract the follower pins toward the image plane are formed in the cam cylinder when the follower pins are pushed toward the image plane by said third lens holding unit.

4. A lens barrel according to claim 1, wherein said urging unit comprises a compression coil spring.

5. An image pickup apparatus comprising:
   a lens barrel according to claim 1,
   wherein the lens barrel includes a zoom mechanism that moves along in a direction of optical axis between a shooting state and a retracted state to change shooting magnifications.

* * * * *